United States Patent [19]  [11] 4,444,056
Romo  [45] Apr. 24, 1984

[54] TEMPERATURE COMPENSATED CIRCUIT
[75] Inventor: Edgar A. Romo, Costa Mesa, Calif.
[73] Assignee: ITT Corporation, New York, N.Y.
[21] Appl. No.: 374,972
[22] Filed: May 5, 1982
[51] Int. Cl.³ .............................................. G01L 19/04
[52] U.S. Cl. .................................. 73/708; 324/DIG. 1
[58] Field of Search ............................... 73/708, 766, 765, 862.63, 73/725, 726, 727, 753, 719, 720, 721; 324/DIG. 1

[56] References Cited
U.S. PATENT DOCUMENTS

| | | | |
|---|---|---|---|
| 3,161,821 | 12/1964 | Price et al. | 73/765 |
| 3,722,264 | 3/1973 | Talmo et al. | 73/769 |
| 3,841,150 | 10/1974 | Pearson | 73/766 |
| 3,847,017 | 11/1974 | Watts | 73/765 |
| 4,202,218 | 5/1980 | Romo | 73/708 |
| 4,233,848 | 11/1980 | Sato et al. | 73/721 |
| 4,300,395 | 11/1981 | Shirouzu et al. | 73/727 |
| 4,337,665 | 7/1982 | Sato et al. | 73/708 |
| 4,362,060 | 12/1982 | Okayama et al. | 73/721 |

Primary Examiner—Donald O. Woodiel
Attorney, Agent, or Firm—T. E. Kristofferson; A. D. Stolzy

[57] ABSTRACT

A differential pressure unit to induce tension and compression in respective strain gages to produce a change in the output of a Wheatstone bridge. The differential pressure or some function thereof is then indicated. Error due to temperature is avoided by maintaining the bridge current constant. The bridge voltage is elevated as a function of temperature to make the bridge current or bridge output independent of temperature.

4 Claims, 6 Drawing Figures

BRIDGE 15

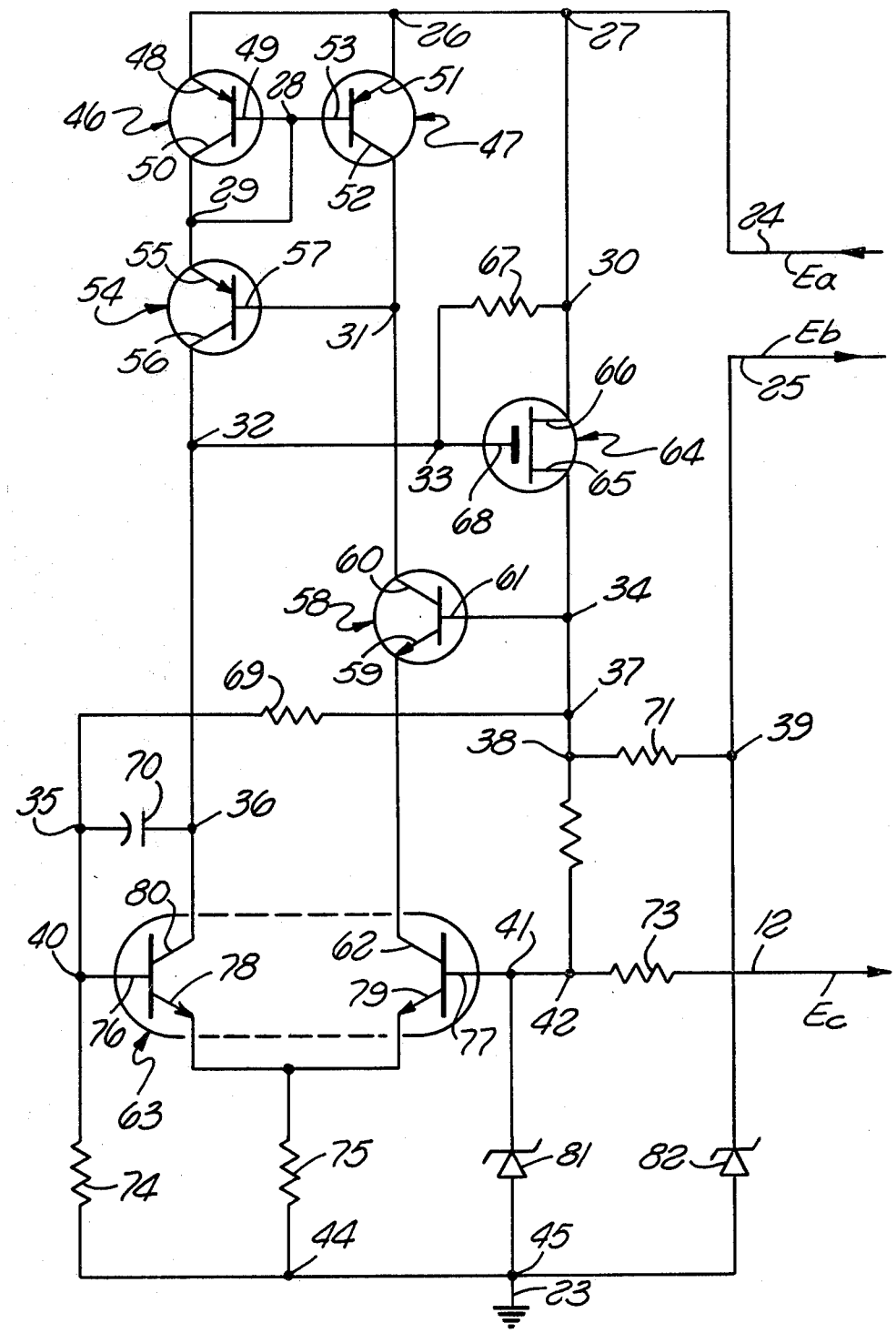
FIG. 2 VOLTAGE REGULATOR 10

BRIDGE CIRCUIT 11

AMPLIFIER CIRCUIT 16

OUTPUT CIRCUIT 19

TEMPERATURE COMPENSATED CIRCUIT

BACKGROUND OF THE INVENTION

This invention relates to a temperature compensation circuit, and more particularly to a feedback control of voltage and/or current.

PRIOR ART STATEMENT

It is known in the art to mount a silicon strain gage on each side of a cantilever beam. The beam is then deflected in accordance with the difference between two pressures. The strain gages are connected in a bridge circuit, the output of which may be partially temperature compensated. However, further temperature compensation is needed. For prior art concerning these arrangements see R. E. Talmo et al. U.S. Pat. No. 3,722,264 issued Mar. 27, 1973, and E. A. Romo U.S. Pat. No. 4,202,218 issued May 13, 1980.

SUMMARY OF THE INVENTION

The above-described and other disadvantages of the prior art are overcome by providing apparatus to keep the output of a strain gage bridge independent of temperature.

BRIEF DESCRIPTION OF THE DRAWINGS

In the accompanying drawings which illustrate exemplary embodiments of the present invention:

FIG. 2 is a schematic diagram of a voltage regulator shown in FIG. 1;

DESCRIPTION OF THE PREFERRED EMBODIMENT

Figure 1:
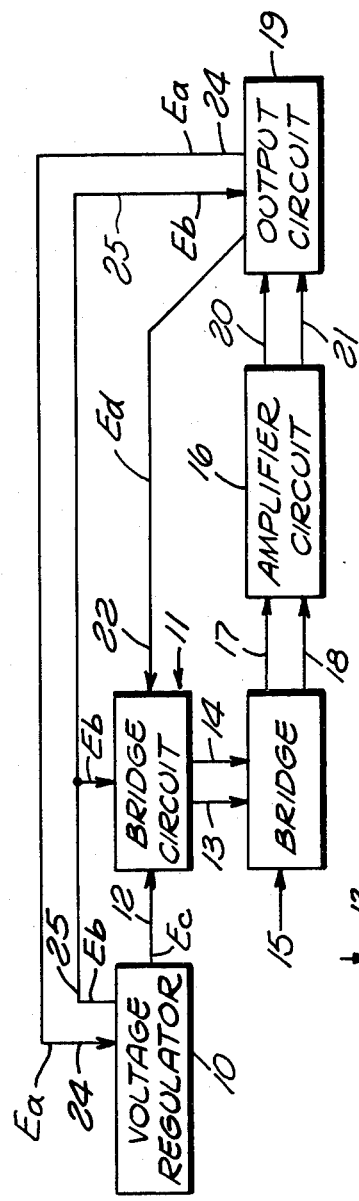
FIG. 1 is a block diagram of one embodiment of the present invention.

In FIG. 1, a voltage regulator 10 is connected to a bridge circuit 11 by a lead 12 that carries a voltage $E_c$. Voltage $E_c$ is essentially a constant regulated voltage. Bridge circuit 11 has output leads 13 and 14 which are connected respectively to the top and bottom of a Wheatstone bridge 15. The output of bridge 15 is impressed upon an amplifier circuit 16 over leads 17 and 18. The output of amplifier circuit 16 is impressed upon an output circuit 19 over leads 20 and 21. Output circuit 19 provides a feedback signal over a lead 22 labeled $E_d$ to bridge circuit 11. Output circuit 19 provides an unregulated DC voltage $E_a$ to voltage regulator 10 over a lead 24. Output circuit 19 also is provided with a regulated DC voltage $E_b$ from voltage regulator 10. Voltage regulator 10 also provides the same regulated voltage $E_b$ to bridge circuit 11.

Most any conventional voltage regulator may be substituted for voltage regulator 10 shown in FIG. 2. However, voltage regulator 10 in FIG. 2 will be described in detail as follows.

Regulator 10 is grounded at 23 as shown in FIG. 2. Regulator 10 has an input lead 24 and output leads 25 and 12. Regulator 10 has junctions at 26, 27, 28, 29, 30, 31, 32, 33, 34, 35, 36, 37, 38, 39, 40, 41, 42, 43, 44 and 45.

Transistors 46 and 47 are provided. Both of these transistors are PNP type transistors. Transistor 46 has an emitter 48 connected from junction 26, a base 49 connected from junction 28, and a collector 50 connected from junction 29. Junctions 28 and 29 are connected together.

Transistor 47 has an emitter 51 connected from junction 26, a collector 52 connected from junction 31, and a base 53 connected to junction 28. Another transistor 54 is also provided. Transistor 54 is a PNP type transistor having an emitter 55 connected from junction 29, a collector 56 connected from junction 32 and a base 57 connected from junction 31. Still another transistor 58 is provided having an emitter of 59 connected to a collector 62 of a twin transistor 63. Transistor 58 also has a collector 60 connected from junction 31, and a base 61 connected from junction 34. A field effect transistor (FET) 64 is also provided having a source 65 connected at junction 34 and a drain 66 connected at junction 30. Junctions 27 and 30 are connected together. A resistor 67 is connected between junctions 30 and 33.

FET 64 also has a gate 68 connected to junction 33. Junctions 32 and 33 are connected together. Junctions 34, 37 and 38 all are connected together. A resistor 69 is connected between junction 35 and junction 37. A capacitor 70 is connected between junctions 35 and 36. A resistor 71 is connected between junctions 38 and 39. A resistor 72 is connected between junctions 38 and 42. A resistor 73 is connected from junction 42 to lead 12. Junctions 41 and 42 are connected together. Junctions 35 and 40 are connected together. A resistor 74 is connected between junctions 40 and 44. A resistor 75 is connected between junctions 43 and 44.

Transistor twin 63 has one base 76 connected from junction 40. The second base 77 connected from junction 41, emitters 78 and 79 connected together at junction 43, and a collector 80 connected from junction 36. Junctions 32 and 36 are connected together.

Figure 3:
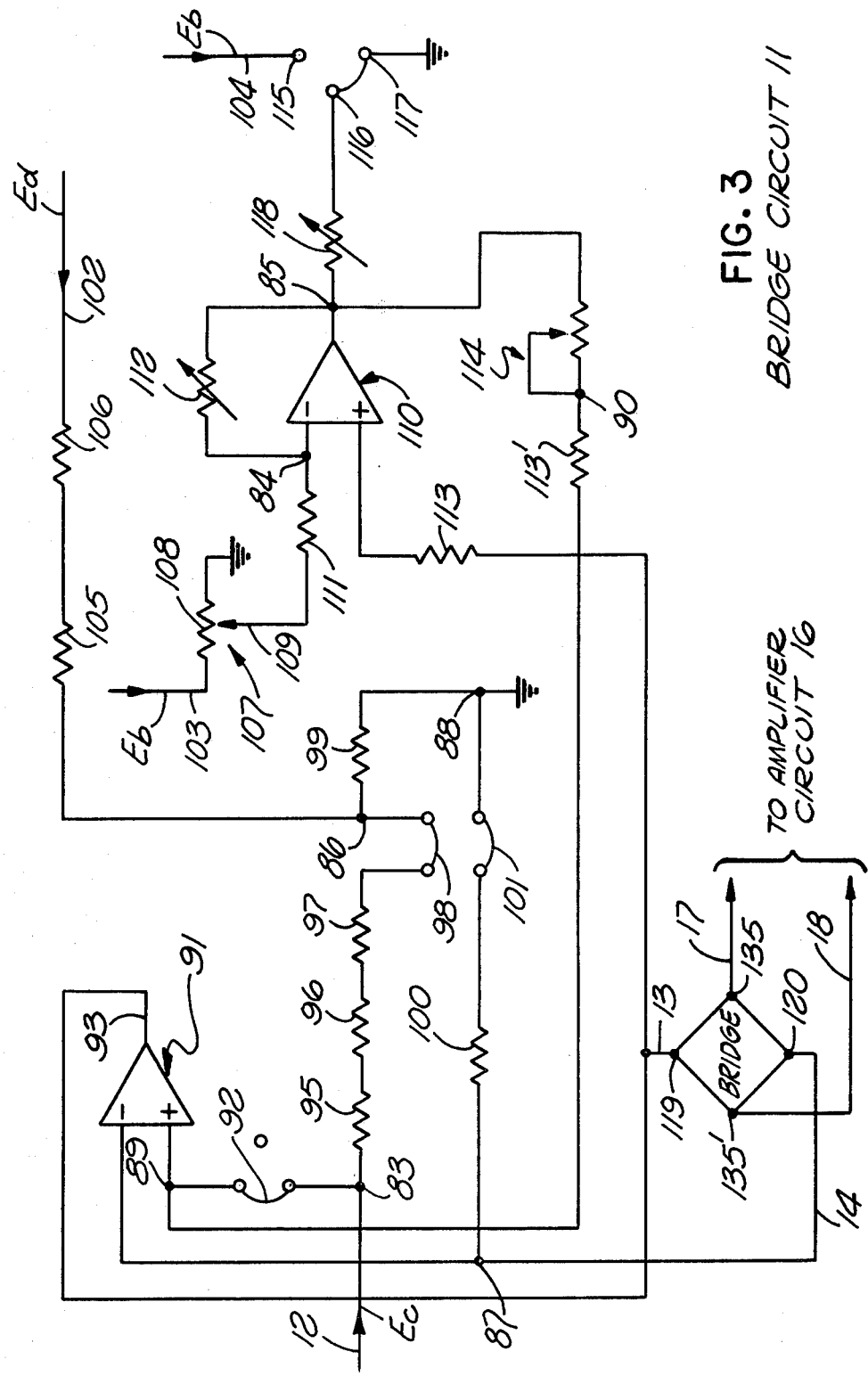
FIG. 3 is a schematic diagram of a bridge circuit shown in FIG. 1.

Transistors 58 and 63 are NPN type transistors. Zener diode 81 is connected between junctions 41 and 45. A zener diode 82 is connected between junctions 39 and 45. Lead 24 is connected from junction 27, lead 25 is connected from junction 39 and lead 12 is connected from resistor 73. Lead 12 carries over into FIG. 3, and is connected to a junction 83. FIG. 3 has junctions 84, 85, 86, 87, 88 and 90. An operational amplifier is provided at 91 having a connection from lead 12 via junction 83 and jumper 92 to the non-inverting input of amplifier 91.

Amplifier 91 has an input from junction 87 to the inverting input thereof. The bottom junction 120 of bridge 15 is connected to junction 87. The top junction 119 of bridge 15 is connected from the output lead 93 of amplifier 91. Bridge 15 has output leads 17 and 18 connected to amplifier circuit 16 as before.

Resistors 95, 96 and 97 with the jumper 98 connects junction 83 to junction 86. A resistor 99 connects junction 86 to junction 88. Junction 88 is grounded.

A resistor 100 is connected with a jumper 101 between junction 87 to junction 88. Bridge circuit 11 shown in FIG. 3 has output leads 102, 103 and 104. Resistors 105 and 106 connect junction 86 to output lead 102.

Amplifier 91 is a differential amplifier. Similarly, an amplifier 110 is shown in FIG. 3 which is also a differential amplifier. Amplifier 110 has an inverting input connected from junction 84. A potentiometer is provided at 107 having a winding 108 and a wiper 109. A resistor 111 is connected between wiper 109 and junction 84. Winding 108 is connected between lead 103 and ground. An adjustable feedback resistor 112 is connected between junctions 84 and 85. A resistor 113 is connected from junction 19 to the noninverting input of amplifier 110. A resistor 113' and a potentiometer 114 are connected together at junction 90. Resistor 113' is connected between junctions 89 and 90. Terminals are provided at 115, 116 and 117. Terminal 117 is grounded. Terminal 115 is connected to output lead 104. A variable resistor 118 is connected from junction 85 to terminal 116.

Figure 4:
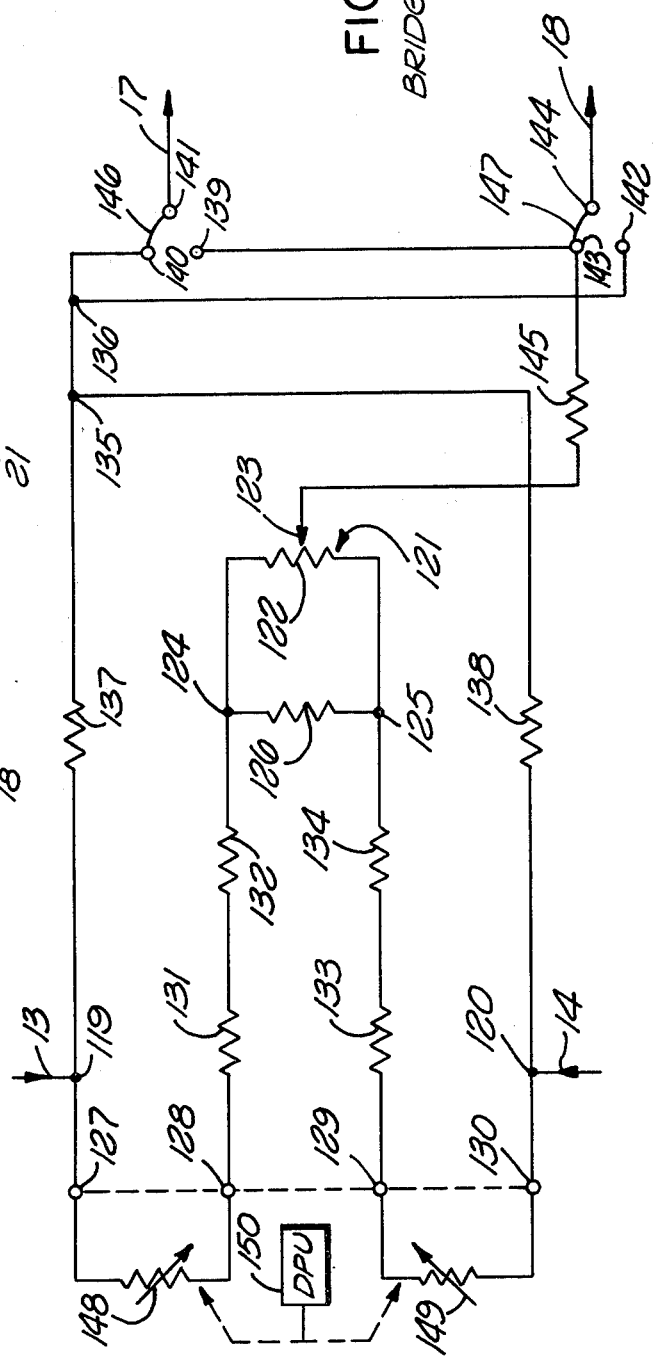
FIG. 4 is a schematic diagram of a Wheatstone bridge shown in FIG. 1.

Bridge 15 shown in FIG. 4 is a Wheatstone bridge. Leads 13 and 14 are connected respectively to junctions 119 and 120. Junctions 119 and 120 form upper and lower corners of the bridge. A potentiometer 121 is provided having a winding 122 and a wiper 123. Winding 122 is connected between junctions 124 and 125. A resistor 126 is also connected between junctions 124 and 125. Terminals are provided at 127, 128, 129 and 130. Terminal 127 is connected to junction 119. Terminal 128 is connected to junction 124 via resistors 131 and 132. Terminal 129 is connected to junction 125 via resistors 133 and 134. Terminal 130 is connected to junction 120. Junctions 135 and 136 are connected together. A resistor 137 is connected between junctions 119 and 135. A resistor 138 is connected between junctions 120 and 135. Terminals are provided at 139, 140, 141, 142, 143 and 144. A resistor 145 is connected from potentiometer wiper 123 to terminal 143. Terminals 139 and 143 are connected together. A jumper 146 is provided to connect terminals 140 and 141. A jumper 147 is provided to connect terminals 143 and 144. Output lead 117 and 18 are connected respectively from terminals 141 and 144. Terminal 142 is connected from junction 136. Terminal 140 is also connected from terminal 136. A strain gage 148 is connected between terminals 127 and 128. A second strain gage 149 is connected between terminals 129 and 130. Strain gages 148 and 149 may be physically mounted the same as or similar to those disclosed in R. E. Talmo et al., U.S. Pat. No. 3,722,264 issued Mar. 27, 1973.

A differential pressure unit (DPU) 150 increases and decreases the respective resistances of strain gages 148 and 149, or vice versa. See E. A. Romo U.S. Pat. No. 4,202,218 issued May 13, 1980. See also all of the references cited in the said Roma patent.

Figure 5:
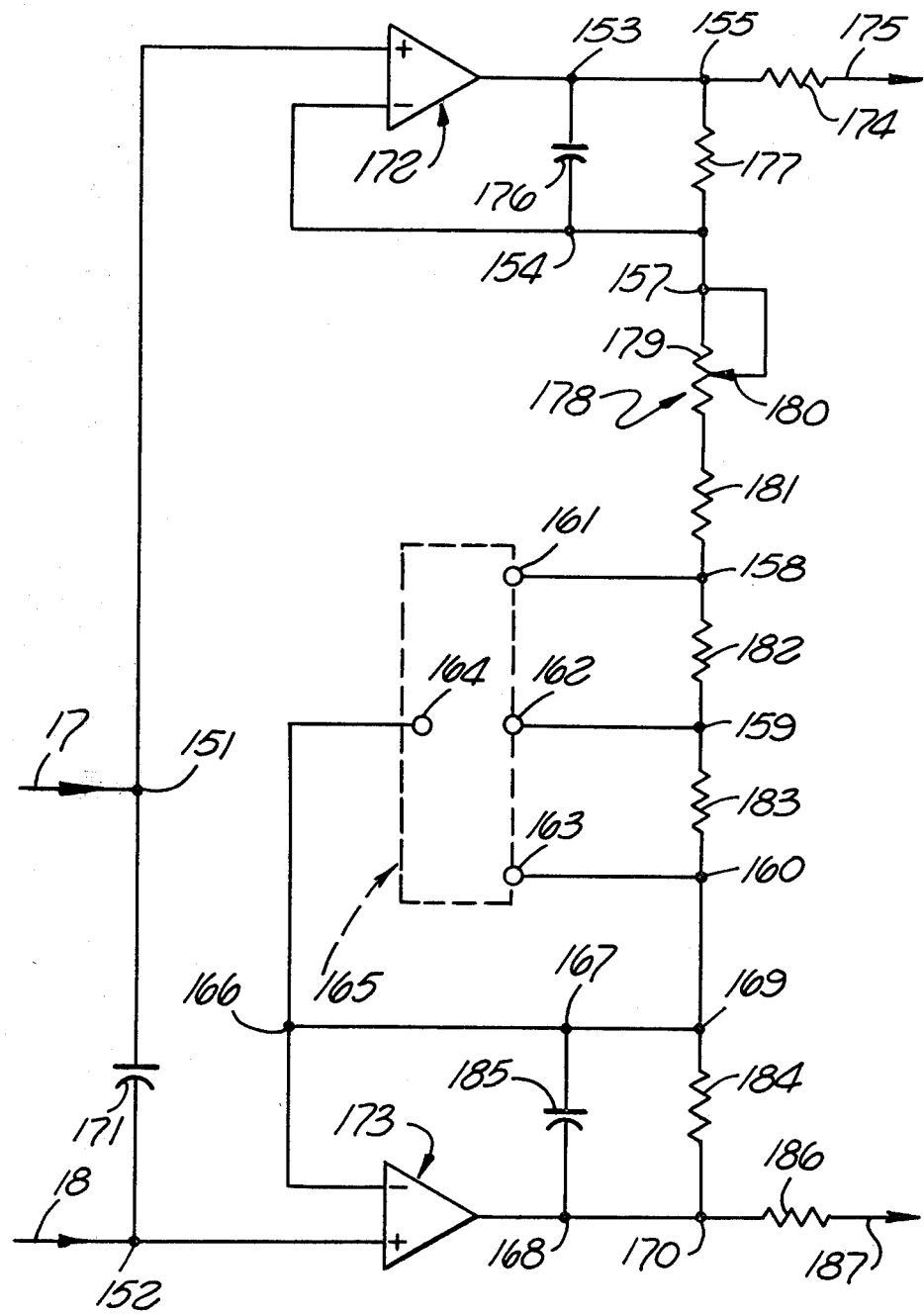
FIG. 5 is a schematic diagram of an amplifier circuit shown in FIG. 1.

Amplifier circuit 16 is shown in FIG. 5 including junctions 151, 152, 153, 154, 155, 156, 157, 158, 159, 160, 166, 167, 168, 169 and 170.

Amplifier circuit 16 is provided with a switch 165 which is a single pole triple throw switch with a pole terminal 164 and contact terminals 161, 162 and 163. Pole terminal 164 is connected to junction 166. Junctions 166, 167 and 169 are connected together. A capacitor 171 is connected between junctions 151 and 152. Leads 17 and 18 which are the output leads of bridge 15 shown in FIG. 4 are connected respectively to junctions 151 and 152.

Differential amplifiers 172 and 173 are provided. Amplifier 172 has an non-inverting input connected from junction 151. Amplifier 173 has a non-inverting input connected from junction 152. Amplifier 172 has an inverting input connected from junction 154.

Amplifier 173 has an inverting input connected from junction 166.

The output of amplifier 172 is connected to junction 153. Junctions 153 and 155 are connected together. A resistor 174 is connected to an output lead 175 from junction 155. A capacitor 176 is connected between junctions 153 and 154. A resistor 177 is connected between junctions 155 and 157. A potentiometer 178 is provided having a winding 179 and a wiper 180. Wiper 180 is connected from junction 157. Winding 179 and a resistor 181 are connected from junction 157 to junction 158. A resistor 182 is connected from junction 158 to junction 159. A resistor 183 is connected between junctions 159 and 160. Junctions 160 and 169 are connected together. A resistor 184 is connected between junctions 169 and 170. A capacitor 185 is connected between junctions 167 and 168.

The output of amplifier 173 is connected to junction 168. Junctions 168 and 170 are connected together. A resistor 186 is connected from junction 170 to an output lead 187.

Figure 6:
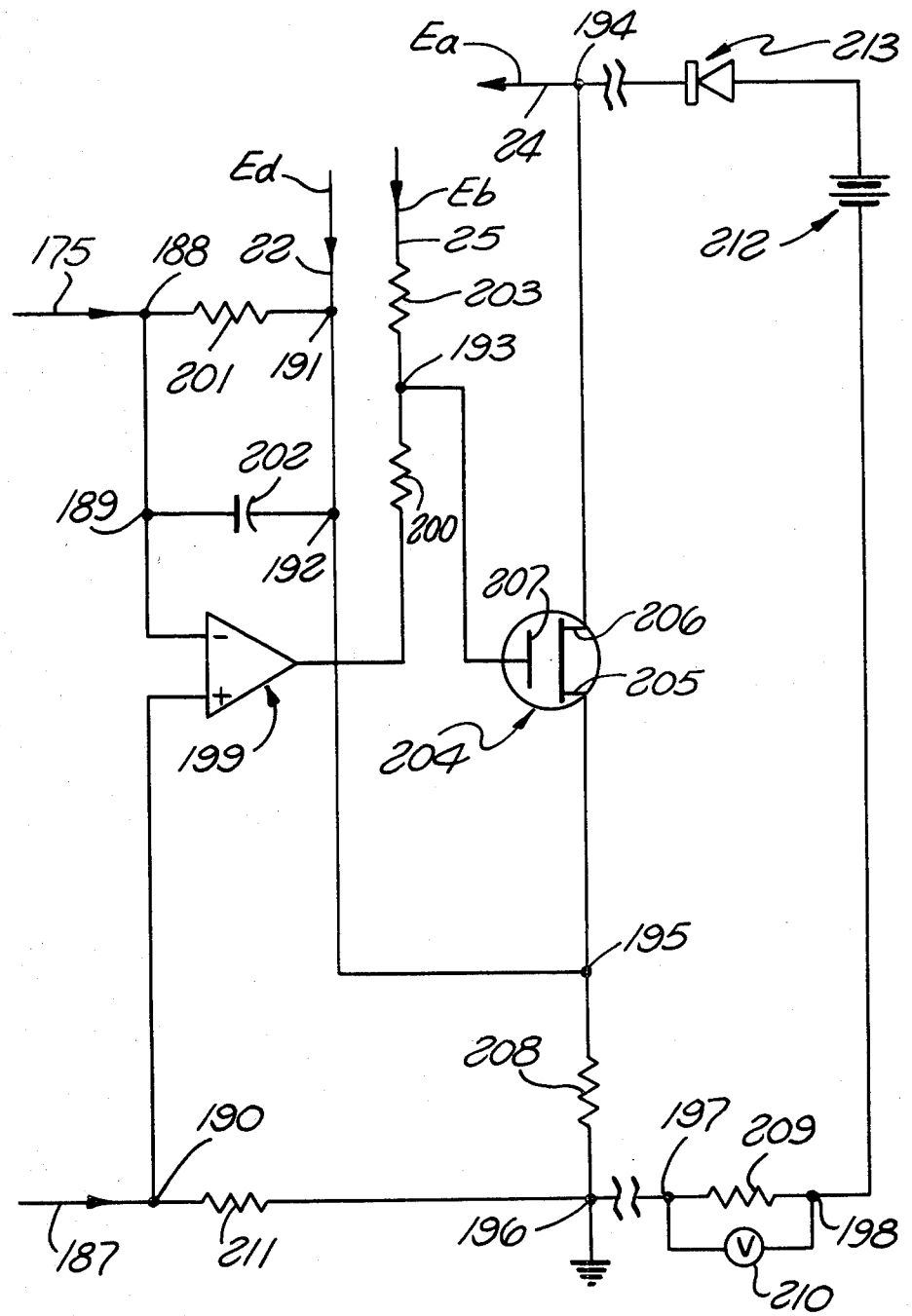
FIG. 6 is a schematic diagram of an output circuit shown in FIG. 1.

Output circuit 19 shown in FIG. 6 includes junctions 188, 189, 190, 191, 192, 193, 194, 195, 196, 197 and 198. Output leads 175 and 187 from amplifier circuit 16 shown in FIG. 5 are connected respectively to junctions 188 and 190.

A differential amplifier is provided at 199. Amplifier 199 has a non-inverting input connected from junction 190 and an inverting input connected from junction 189. A resistor 200 is connected from the output of amplifier 199 to junction 193. A resistor 201 is connected between junctions 188 and 191. A capacitor 202 is connected between junctions 189 and 192. Junctions 188 and 189 are connected together. Junctions 191 and 192 are connected together. Junctions 192 and 195 are connected together. Lead 22 is connected to junction 191.

A resistor 203 connects junction 193 with lead 25.

A field effect transistor (FET) 204 is provided having a source 205, a drain 206 and a gate 207. Gate 207 is connected from junction 193. Source 205 is connected from junction 195. Drain 206 is connected from junction 194.

A resistor 208 is connected between junctions 195 and 196. Substantially everything to the right of junction 196 as viewed in FIG. 6 may be remote, if desired. It is the current flow from junction 197 to junction 198 via resistor 209 that is directly proportional to the output of bridge 15 shown in FIG. 4. A voltmeter 210 is provided which is connected from junction 197 to junction 198 in parallel with resistor 209. If desired, voltmeter 210 may be calibrated in pressure or differential pressure.

A resistor 211 is connected between junctions 190 and 196. Junction 196 is grounded. From junction 198 to junction 194 through a source of potential 212, a diode 213 is connected in series.

Lead 24 is connected from junction 194.

OPERATION

In FIG. 1, voltage regulator 10 supplies two regulated voltages which may be utilized to control the "current" and "voltage" amplifiers 91 and 110, respectively, shown in FIG. 3. Bridge circuit 11 contains feedback for causing the voltage across bridge 15 to vary with temperature the same as the remainder of the circuit does. That is, the said constant voltage is constant to within 100 divided by the gain of the bridge circuit 11 in percent. The gain of bridge circuit 11 may be 40 or 50, for example.

The output of bridge 15 is amplified in circuit 16 and circuit 19, circuit 19 containing an indicator (voltmeter 210) of the differential pressure measured by bridge 15. As stated previously, bridge 15 may be conventional and the strain gages 148 and 149 thereof may be conventional. Strain gages 148 and 149 may be affixed to a strain gage beam that is in turn moved according to the difference between two pressures. The construction of strain gages 148 and 149, their method of mounting and the construction of a differential pressure unit and a strain gage beam are all old in the art, per se. For example, see the said Talmo and Romo patents.

Lead 24 (FIG. 1) simply supplies the unregulated voltage $E_a$ of source 212 (FIG. 6) to voltage regulator 10. See all of FIGS. 1, 2 and 6.

In FIG. 2, a regulated voltage is supplied from zener 82 as $E_b$ in FIGS. 3 and 6.

Jumpers and terminals similar to 115, 116 and 117 (FIG. 3) throughout all the drawings are employed because strain gages 148 and 149 match but cannot be matched perfectly.

$E_d$ is directly proportional to the current through resistor 208 (FIG. 6). $E_d$ is therefore a feedback voltage for linearity as is conventional.

The present invention shown in FIG. 1 may be entirely conventional except for bridge circuit 11 shown in FIG. 3. This circuit keeps the bridge current constant. This prevents changes in temperature from making the reading of voltmeter 210 in FIG. 6 incorrect. See the algebraic proof in the said Romo patent.

In FIG. 3, $E_c$ is a regulated voltage from zener 81 through resistor 73 over lead 12 from FIG. 2. In FIG. 3, feedback ($E_d$) comes over lead 102, resistors 106 and 105, jumper 98 through resistors 97, 96 and 95 via jumper 92 to the noninverting input of amplifier 91. It is applied thereto with (+) the voltage of zener 81 via resistor 73.

A second feedback for bridge voltage control is supplied from junction 85 in FIG. 3 through potentiometer 114 and resistor 113' to the noninverting input of amplifier 91. Amplifier 91 thus supplies a voltage to junction 119 which will cause the noninverting input to amplifier 110 to be equal to that of the constant potential of junction 84. This holds junction 119 at a potential which is a function of temperature.

The voltage drop across resistor 100 is directly proportional to the bridge current. Then the potential of junction 87 keeps the bridge current constant if the temperature is constant. Thus bridge circuit 11 keeps the bridge current constant. This provides the improved temperature insensitivity of the present invention.

The "bridge current" is hereby defined as the current flowing in leads 13 and 14. Wiper 123 (FIG. 4) is essentially a bridge junction 135' (FIG. 3).

The impedance between leads 17 and 18 and ground looking to the right in FIG. 5 is effectively infinite because the same is true of the input impedances of the amplifiers 172 and 173.

The current of bridge 15 is kept constant by the connection of junctions 87 to amplifier 91 (FIG. 3). Junction 87 is at the most positive or negative point on resistor 100 (note resistor 100 is connected to ground through jumper 101 and junction 88).

Calibration may be made by adjusting all the jumpers and elements 107, 112, 114 and 118. Amplifier 110 adds to the potential of junction 119 as it tends to fall with the bridge current.

The temperature sensitivity of strain gages 148 and 149 may be linear so that amplifier 110 can supply a correction for the rate of change of the sum of the resistances of strain gages 148 and 149.

Strain gages 148 and 149 may be silicon strain gages, if desired. The resistance of the winding of potentiometer 121 and those of resistors 131, 132, 133, 134 and 145 may be much smaller than the sum (R) of the resistances of strain gages 148 and 149 or the equivalent resistance between junctions 119 and 120 or 119 and ground. R may then be much smaller than the sum of the resistances of resistors 137 and 138. Thus the potential e of bridge junction 119 (FIGS. 3 and 4) is a known function of temperature T. This is true because effectively $$e = iR \tag{1}$$

where
  i is the constant bridge current established by feedback from resistor 100 (FIG. 3) to the noninverting input of amplifier 91 (FIG. 3).

Thus if R varies with T:

$$R = R_o(1 + \alpha \Delta T) \tag{2}$$

where
  $R_o = R$ at $\Delta T = 0$
  $\alpha$ is the thermal coefficient of resistance of strain gages 148 and 149, and
  $\Delta T$ is the change in temperature from a reference at which $\Delta T = 0$.

That is $$\Delta T = T - T_r \tag{3}$$

where
  $T_r$ is the reference temperature.

From (1), (2) and (3):

$$e = iR_o(1 + \alpha \Delta T) \tag{4}$$

Thus, $$e = f(T) \tag{5}$$

By making $$e = e_o(1 + \alpha \Delta T) \tag{6}$$

combining (4) and (6)

$$e_o(1 + \alpha \Delta T) = iR_o(1 + \alpha \Delta T) \tag{7}$$

$$e_o = iR_o \tag{8}$$

$$i = (e_o/R_o) \tag{9}$$

Thus current i is constant if $e_o$ and $R_o$ are constant.

Equation (6) is effected by the input and control from resistor 113' to junction 89 and amplifier 91.

The empirical determination of resistances 108, 111, 112, 118, 114, 113' and the position of wiper 109 is made by placing the circuit elements connected as shown in FIGS. 1–6 in an oven, heating the same, and measuring e at junction 119 and T at $\Delta T = 0$ and at successive temperatures above $T_r$.

Also,
if $$e = f_c(T) \tag{10}$$

and $$R = f_r(T) \quad (11)$$

then $$\frac{f_e(T)}{e} \cong \frac{f_r(T)}{R} \quad (12)$$

What is claimed is:

1. Differential pressure apparatus comprising: a Wheatstone bridge having first, second, third and fourth junctions, a first leg including a first strain gage connected between said first and second junctions, a second leg including a second strain gage connected between said second and third junctions, a first resistor connected between said third and fourth junctions, a second resistor connected between said fourth and first junctions; a first differential amplifier having a first noninverting input, a first inverting input and a first output; a second differential amplifier having a second noninverting input, a second inverting input and a second output, said first output being connected to said third junction; resistor means to connect said second noninverting input from said first output; resistor means to supply a regulated voltage to said second inverting input; resistor means to connect said second output to said first noninverting input; resistor means to supply a regulated voltage to said first noninverting input; and a third resistor connected from said first junction to a point of reference potential, said first junction being connected to said first inverting input.

2. The invention as defined in claim 1, wherein a two wire line is provided, and modulation means connected from said second and fourth junctions to vary the current in said two wire line in direct proportion to the voltage between said second and fourth junctions.

3. A temperature compensated circuit comprising: a Wheatstone bridge having first, second, third and fourth junctions, a first leg including a first strain gage connected between said first and second junctions, a second leg including a second strain gage connected between said second and third junctions, a first resistor connected between said third and fourth junctions, a second resistor connected between said fourth and first junctions; first means to supply a potential to said third junction, said first means being responsive to the potential at said third junction, said potential at said third junction being e where $$e \cong e_o(1 + \alpha \Delta T),$$

$e_o$ is a constant,
$\alpha$ is a constant, $$\Delta T = T - T_r,$$

where
T is ambient temperature, and
$T_r$ is a reference temperature,
said first means being connected from said third junction through amplifier means back to said third junction; a third resistor connected from said first junction to ground, and second means connected from said first junction to maintain the current through said third resistor constant when T is constant, said first means rendering said third resistor substantially constant as T varies.

4. A temperature compensated circuit comprising: a Wheatstone bridge having first, second, third and fourth junctions, a first leg including a first strain gage connected between said first and second junctions, a second leg including a second strain gage connected between said second and third junctions, a first resistor connected between said third and fourth junctions, a second resistor connected between said fourth and first junctions; first means to supply a potential to said third junction, said first means being responsive to the potential at said third junction; a third resistor connected from said first junction to ground; and second means connected from said first junction to maintain the current through said third resistor constant when the ambient temperature is constant, said first means causing an output voltage appearing between said second and fourth junctions to be substantially independent of temperature.

* * * * *